UNITED STATES PATENT OFFICE.

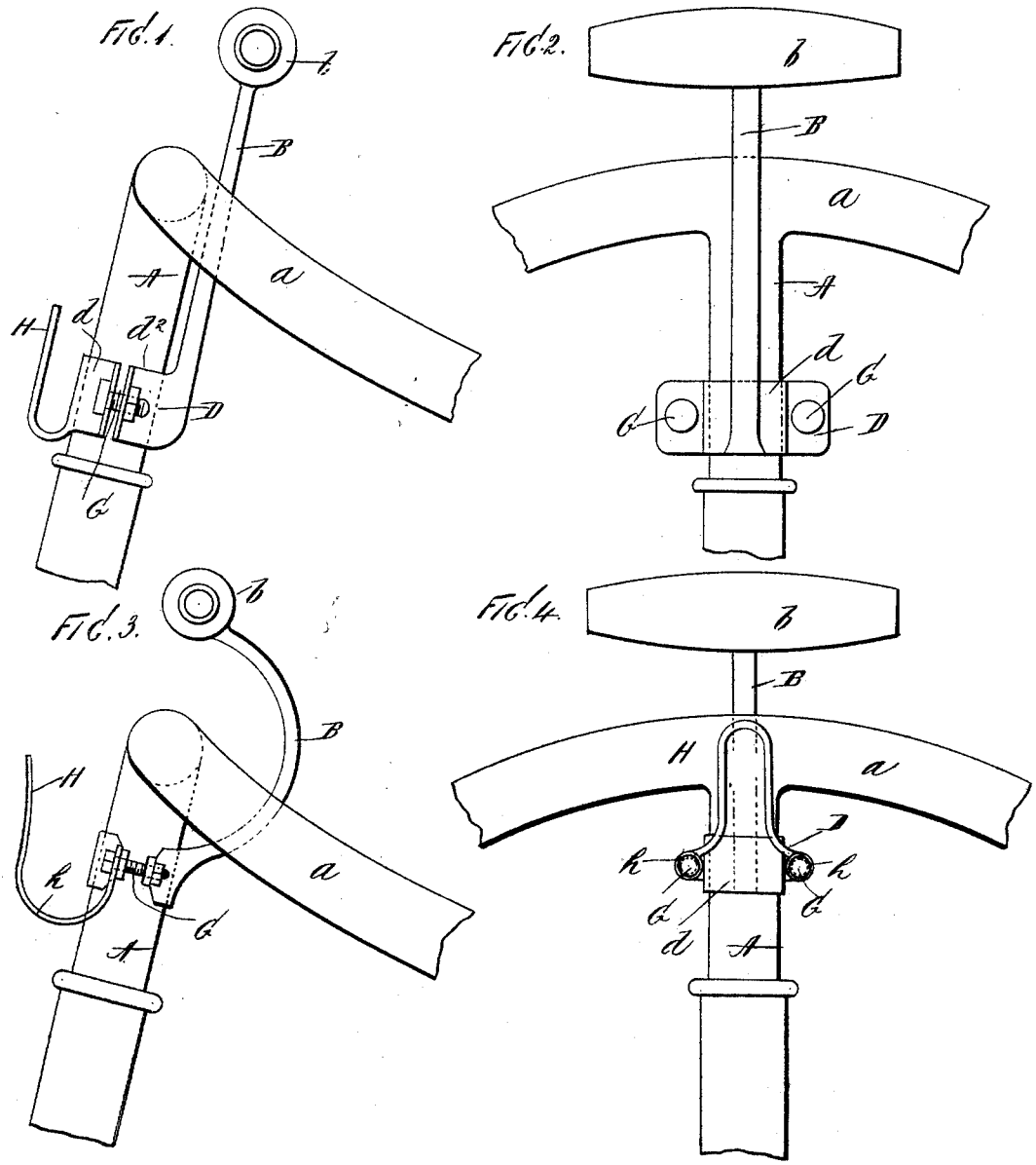

WALTER C. BURBANK, OF NEW YORK, N. Y.

BICYCLE ATTACHMENT.

SPECIFICATION forming part of Letters Patent No. 586,591, dated July 20, 1897.

Application filed May 8, 1896. Serial No. 590,792. (No model.)

*To all whom it may concern:*

Be it known that I, WALTER C. BURBANK, a citizen of the United States, and a resident of New York, in the county of New York and State of New York, have invented certain new and useful Improvements in Bicycle Attachments, of which the following is a specification, reference being had to the accompanying drawings, forming a part thereof, in which similar letters of reference indicate corresponding parts.

This invention relates to bicycles and similar vehicles; and the object thereof is to provide a supplemental handle or handle-bar which is adapted to be connected with the forward upright rod of the frame and which extends above the point where the main handle-bar connects therewith, a further object being to provide a supplemental handle-bar which is detachably connected with the forward upright rod of the frame of the bicycle or similar vehicle and with which is also connected a support for a lantern, the supplemental handle-bar being designed for use by teachers and by riders when it is desirable to change the position of the hands.

The invention is fully disclosed in the following specification, of which the accompanying drawings form a part, in which—

Figure 1 is a side view of the upper part of the forward upright rod of the bicycle-frame, showing also a portion of the main handle-bar and my supplemental handle-bar connected therewith; Fig. 2, a back view thereof; Fig. 3, a view similar to Fig. 1, showing a modified form of construction; and Fig. 4 a front view thereof.

In the drawings forming part of this specification, A represents the upper part of the forward upright of the bicycle-frame, and $a$ the main handle-bar; and in the practice of my invention I provide a supplemental handle-bar B, which is provided at its upper end with a transverse handle $b$, and the supplemental handle-bar B is connected with the rod A by a clamp D, which consists of two parts $d$ and $d^2$, which are bolted together, as clearly shown in the drawings, each of said parts being provided with outwardly-directed end plates, through which bolts G are passed.

Secured to and formed on the forward part $d$ of the clamp D is a hook or bracket H, which is adapted to serve as a support for a lantern, and in the construction shown in Figs. 3 and 4 this hook or support H is made in the form of a yoke and is composed of wire, the ends of which are bent downwardly and backwardly, as shown at $h$, and provided with eyes or rings, through which the bolts G are passed.

In Fig. 3 the handle-bar B is curved outwardly, upwardly, and forwardly and is segmental or semicircular in form, and the object of curving the supplemental bar in this manner is to provide suitable space for the upper end of the rod A and the connection of the main handle-bar $a$, this connection being sometimes made in such a manner that an annular shoulder or head is formed at this point.

The supplemental handle-bar B is vertically adjustable and may be quickly and easily connected with the rod A and removed therefrom, and I thus provide means whereby the rider may, whenever desirable, change the position of his hands, the handle $b$ being of such length as to accommodate both hands, and this device is also of great benefit to teachers, and by means thereof the machine may be held in an upright position without interfering with the main handle-bar or the operation thereof.

This device is simple in construction and operation and perfectly adapted to accomplish the result for which it is intended, and it is evident that changes in and modifications of the construction herein described may be made without departing from the spirit of my invention or sacrificing its advantages.

Having fully described my invention, I claim as new and desire to secure by Letters Patent—

The combination with the forward upright rod of a bicycle or similar vehicle with which the main handle-bar is connected, and a supplemental handle-bar and support therefor, consisting of a clamp which is adapted to be connected with said forward upright rod below the main handle-bar, and which is adjustable thereon, said clamp being provided with an upwardly-directed arm which projects above the main handle-bar, and to which the supplemental handle-bar is secured, substantially as shown and described.

In testimony that I claim the foregoing as my invention I have signed my name, in presence of the subscribing witnesses, this 6th day of May, 1896.

WALTER C. BURBANK.

Witnesses:
C. GERST,
C. G. MILLIN.